Jan. 12, 1971     F. B. MERCER ET AL     3,554,853
EXTRUDED PLASTIC NET MADE OF NON-CYLINDRICAL STRANDS ORIENTED
AT POINTS REMOTE FROM BONDED AREAS
Filed Nov. 2, 1967

INVENTORS
FRANK BRIAN MERCER
KEITH FRASER MARTIN
BY ATTORNEY

INVENTORS
FRANK BRIAN MERCER
KEITH FRASER MARTIN
BY ATTORNEY

United States Patent Office 3,554,853
Patented Jan. 12, 1971

3,554,853
EXTRUDED PLASTIC NET MADE OF NON-CY-
LINDRICAL STRANDS ORIENTED AT POINTS
REMOTE FROM BONDED AREAS
Frank Brian Mercer and Keith Fraser Martin, Blackburn,
England, assignors to Plastic Textile Accessories
Limited, Blackburn, England, a British company
Filed Nov. 2, 1967, Ser. No. 680,089
Int. Cl. B32b 3/10
U.S. Cl. 161—109                                3 Claims

ABSTRACT OF THE DISCLOSURE

An integral extruded thermoplastic net structure, which has been molecularly oriented in known manner, comprising two sets of strands and integral extruded intersections, wherein each strand comprises at least two distinct and demarcated linear portions, viz a base portion adjacent the median plane of the net and one or more outlying portions extending from the base portion away from said plane, the thermoplastic material in the outlying portion or portions being molecularly oriented throughout the continuous length of each strand and the thermoplastic material in the base portion being molecularly oriented between the net intersections leaving the two sets of strands connected together at their intersections by the unoriented intercepts of the base portions of the strands.

---

Figure 1:
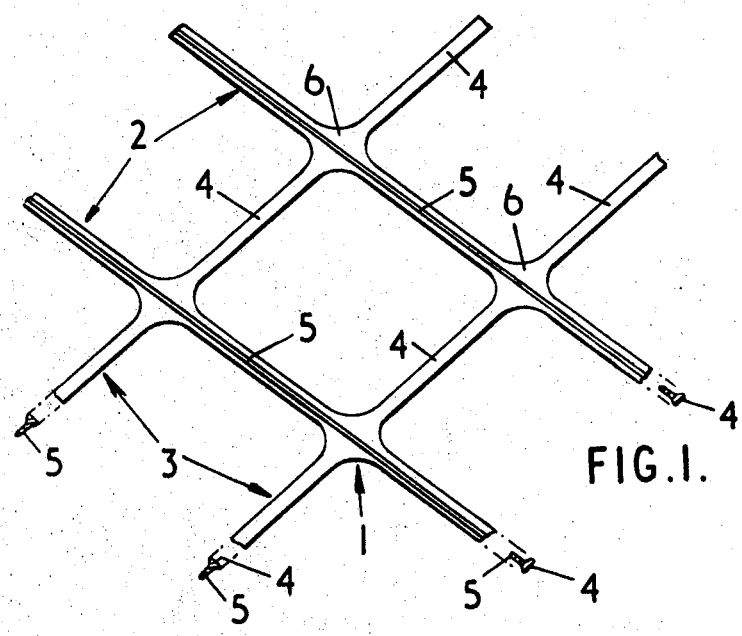

This invention relates to the extrusion of integral (i.e. knotless) thermoplastic netting by methods and apparatus of the character described, for example, in our British patent specification No. 836,555.

According to the above specification the production of, for example, tubular netting is effected by extruding the thermoplastic material through circumferentially extending die means formed between a pair of extrusion members or dies (hereinafter referred to as die members) having co-axial surfaces adjacent the die means and in sliding contact with one another to form a bearing slideway, one or both of the die members being given continuous rotary or oscillatory motion. The die means are supplied with thermoplastic material from a pressure supply chamber through feed ducts, which may be formed in or through one or both of the contacting co-axial surfaces of the die members and which communicate with the chamber and with the die means. However, the present invention may also be applied to the production of flat or sheet netting from rectilinear or arcuate dies as also described in the above specification.

An object of the present invention is to provide an improved net structure which, after molecular orientation of the net strands by stretching in known manner, has a greater impact strength and tear strength than net strucutres heretofore of the same weight per unit area and the same mesh count transversely of the net. This improved net structure is achieved by extruding net strands of special cross-section, as will be described, through die orifices of a corresponding cross-sectitonal configuration, the extrusion process, including cooling and haul-off of the extruded net, being substantially as heretofore.

The die means according to the present invention may comprise open-sided grooves on the contacting die faces (i.e. of the general character illustrated in the above-mentioned patent) or they may comprise closed bores or ducts each of which feeds a die orifice on the face of the die means, the latter die orifices may open on to the die face on the line of contact of die means or spaced a short distance therefrom.

The invention consists in an integral extruded thermoplastic net structure, which has been molecularly oriented by stretching in known manner, comprising two sets of strands and integral extruded intersections, wherein each strand comprises at least two distinct and demarcated linear portions, viz., a base portion adjacent the median plane of the net and one or more outlying portions extending from the base portion away from said plane.

The invention further consists in an integral extruded thermoplastic net structure, according to the preceding paragraph, wherein the thermoplastic material in the outlying portion or portions is molecularly oriented throughout the continuous length of each strand and the thermoplastic material in the base portion is molecularly oriented between the net intersections leaving the two sets of strands connected together at their intersections by the unoriented intercepts of the base portions of the strands.

The invention further consists of an integral extruded thermoplastic net structure, according to the preceding paragraph, wherein the base portion of each strand is wide (transversely of the strand), compared with the section of the or each outlying portion which is narrow or includes a narrow part adjacent the base portion, but is shallow in the direction away from the median plane of the net, whereby at each intersection the unification of the base portions produces a concentration of the thermoplastic material in the median plane of the net, which concentration is composed of conjoined unoriented intercepts of the otherwise oriented base portions of the strands.

The invention still further consists in an integral extruded thermoplastic net structure, wherein each strand cross-sectiton, prior to stretching, comprises a triangular base portion and one or more rib or flange-like outlying portions. According to this form of the invention the distal edge of the or each rib or flange-like outlying portions may be formed with a rounded bead.

The invention still further consists in an integral extruded thermoplastic net structure, wherein each strand cross-section, prior to stretching, comprises a triangular base portion and an outlying portion of generally T-shape section.

The invention still further consists in an integral extruded thermoplastic net structure, wherein each strand cross-section, prior to stretching, comprises a triangular base portion and an outlying portion of triangular section and inverted with respect to the base portion so that the two triangular sections are united at their apices.

The invention still further consists in an integral extruded thermoplastic net structure, wherein each strand, prior to stretching, comprises a base portion having a flat cross-section with sloping sides converging in the direction away from the median plane of the net and two rib or flange-like outlying portions extending from each edge of the base portion at substantially the same angle as the slope of the sides of the base portion.

Figure 2:
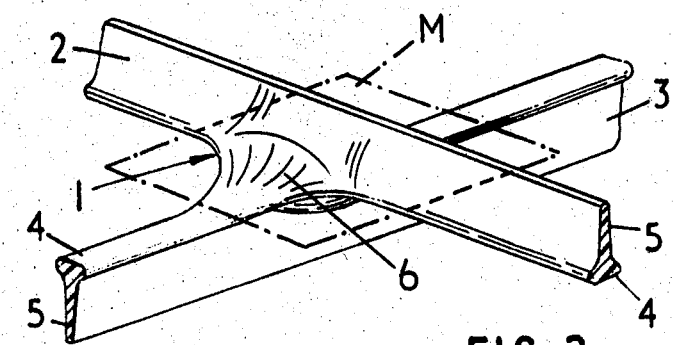
Figure 3:
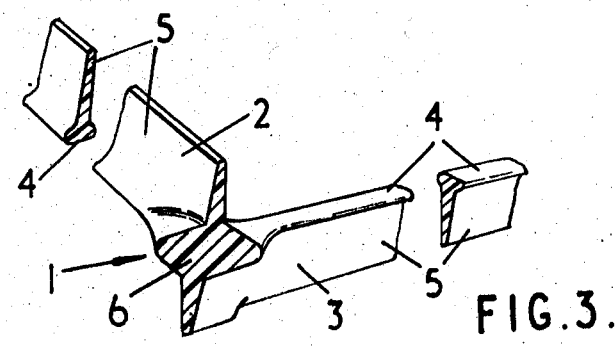
Figure 4:
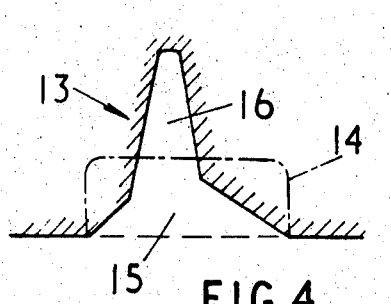
Figure 5:
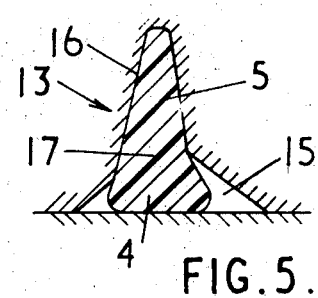
Figure 6:
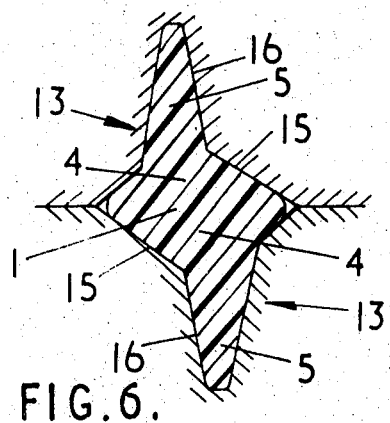
Figure 7:
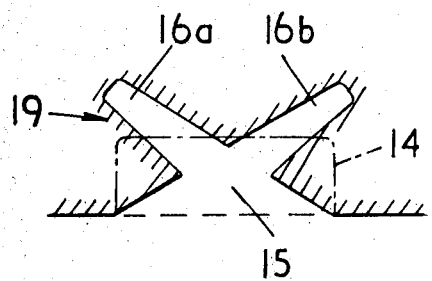

In the accompanying drawings:

FIG. 1 is a plan view of a portion of net according to the present invention with cross-sections of the strands shown, FIG. 2 is a perspective view on an enlarged scale of a net intersection after orientation of a net structure according to the present invention, FIG. 3 is a perspective view on an enlarged scale partly in section of the intersection shown in FIG. 1, FIG. 4 is a cross-section on an enlarged scale of a die orifice for extruding one strand of a net structure as shown in FIG. 1 and according to the present invention, FIGS. 5 and 6 show the die orifice in FIG. 4 respectively extruding a mesh strand and conjointly with similar die orifice in register a net intersection, FIG. 7 is a similar cross-section to FIG. 4 of an alternative form die orifice according to the present invention, and FIGS. 8 (a) – (i) show various forms of suitable die orifice to extrude net structures according to the present invention.

In the net construction according to the present invention, see for example FIG. 1 and of which the intersection 1 of two strands 2 and 3 is shown in FIG. 2, each strand 2 or 3 comprises a base portion 4 and one outlying portion 5. The outlying portions 5, after stretching, are continuously orientated throughout their length, whereas the base portions 4 are orientated between the intersections 1 with unoriented intercepts at the intersections.

The continuity of the outlying portions 5 of the strands 2 and 3 across the intersection 1 and their relatively slender section is shown in FIGS. 2 and 3 together with the distribution of the thermoplastic from the base portions 4 of the strands in the median plane M (FIG. 2) of the net to form an intersection joint of adequate strength involving a concentration 6 of the thermoplastic material in the median plane M between the pairs of strands 2 and 3.

A suitable die orifice 13 for extruding net which when stretched is as shown in FIGS. 1 to 3 is shown in FIG. 4, drawn against the outline of a conventional slot die 14. The area of the die orifice 13 is substantially the same as that of the conventional die orifice 14 (e.g. ratio 12 to 11) and comprises a triangular portion 15 for shaping the strand base portion 4 and an outer portion 16 responsible for shaping the outlying portions 5 of the strands 2 or 3 as a rib or flange-like form, distinct from the base portion 15 (or 4 of the strand itself).

In the case of open slot dies, when a die orifice 13 is separate as in FIG. 4 strands 2 or 3 only are extruded, see FIG. 5, extrudate 17, while when a pair of die orifices 13 are passing in register, see FIG. 6, strand intersections 1 are extruded, the conjoint base portions 15 of the die orifices providing the concentration of material for the structure of the intersections 1 described above.

Figure 8A:
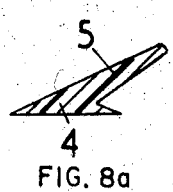
Figure 8B:
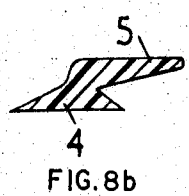
Figure 8C:
Figure 8D:
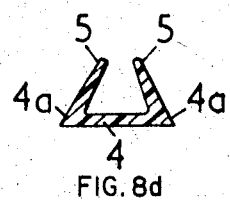
Figure 8E:
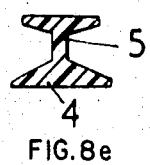
Figure 8F:
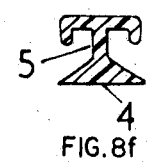
Figure 8G:
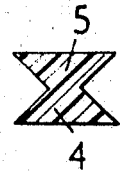
Figure 8H:
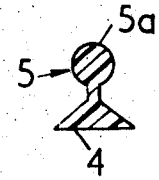
Figure 8I:
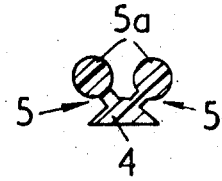

FIG. 7 shows detail of an alternative die orifice form 19 having a base-forming portion 15a and two rib or flange-forming portions 16a and 16b and FIGS. 8(a) to (i) show a variety of still further alternative forms of suitable die orifices for carrying out the present invention. FIGS. 8(a), (b) and (c) show strand cross-sections having triangular base portions 4 and outlying portions 5 of rib or flange form, there being three portions 5 in the case of FIG. 8(c); FIG. 8(d) shows a flat base portion 4 having sloping ends 4a and outlying portions 5 or rib or flange-form extending outwardly at the same angle as the slope of the ends 4a; FIGS. 8(e) and (f) show strands having triangular base portions 4 and outlying portions 5 of T-section; FIG. 8(g) shows a strand having a triangular base portion 4 and an inverted triangular section outlying portion 5 and (FIGS. 8(h) and (i) show strands having outlying portions 5, the distal ends of which have a rounded bead 5a. Different forms produce different net characteristics, e.g. impact and tear strength and handle.

Test runs with the dies shown in FIGS. 4 and 7, using a low density polyethylene having a density of 0.927 and a melt flow index of 0.5, gave the following results compared with the conventional (rectangular) die 14 shown drawn against the dies in FIGS. 4 and 7:

TABLE I

| Type of die | Impact strength | Tear strength |
| --- | --- | --- |
| Rectangular die (14) | 226 | 723 |
| Figure 4 | 283 | 862 |
| Figure 7 | 298 | 960 |

The impact strength and tear strength in the above table were measured on conventional testing equipment (viz impact strength: British Standards Institute, Methods of Testing Plastics, BS 2782/1965. Method 306F. (Falling Dart). Tear strength: Elmendorf Tearing Tester TAPPI Specification T–414M–49).

It will be observed that the FIG. 7 die gives a 32% improvement in impact strength and a 33% improvement in tear strength over net extruded from a conventional die while maintaining the same weight per unit area of net and the same mesh count transversely of the net.

We claim:

1. An integral extruded net of thermoplastic material, comprising two sets of strands having integral extruded intersections wherein each strand comprises at least two distinct and demarcated linear portions forming a base portion adjacent a median plane of the net and at least one outlying portion extending from the base portion away from said plane, the thermoplastic material in the outlying portion being molecularly oriented throughout the continuous length of each strand and the thermoplastic material in the base portion being molecularly oriented between the said intersections leaving the two sets of strands connected together at their intersections by unoriented intercepts of the base portions of the strands.

2. An integral extruded thermoplastic net structure, as claimed in claim 1, wherein the base portion of each strand is wide (transversely of the strand) compared with the section of the or each outlying portion which is narrow or includes a narrow part adjacent the base portion, but is shallow in the direction away from the median plane of the net, whereby at each intersection the unification of the base portions produces a concentration of the thermoplastic material in the median plane of the net, which concentration is composed of conjoined unoriented intercepts of the otherwise oriented base portions of the strands.

3. An extruded plastic net-like structure comprising a set of parallel strands on each side of a median plane, such that bonded intersections of said strands are integral wherein the improvement comprises:

said strands each comprising an oriented base portion adjacent to the median plane extending between the intersections and at least one oriented rib-like portion extending from the base portion away from the median plane and said intersections each comprising a main body portion substantially consisting of the as-extruded base portions of the crossing strands and at least one oriented rib-like portion extending from the main body portion away from each side of the median plane.

References Cited

UNITED STATES PATENTS 3,051,987 9/1962 Mercer _____ 18—12
3,121,040 2/1964 Shaw et al. _____ 161—177

JOHN T. GOOLKASIAN, Primary Examiner

W. E. HOAG, Assistant Examiner

U.S. Cl. X.R.

156—244; 161—123, 252; 264—177, 198